(12) United States Patent
Chiu et al.

(10) Patent No.: US 8,719,645 B2
(45) Date of Patent: *May 6, 2014

(54) RUNTIME DYNAMIC PERFORMANCE SKEW ELIMINATION

(71) Applicant: International Business Machines Corporation, Armonk, NY (US)

(72) Inventors: Lawrence Y. Chiu, Saratoga, CA (US); Paul H. Muench, San Jose, CA (US); Sangeetha Seshadri, Vancouver, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,481

(22) Filed: Jan. 2, 2013

(65) Prior Publication Data

US 2013/0185528 A1 Jul. 18, 2013

Related U.S. Application Data

(63) Continuation of application No. 13/098,143, filed on Apr. 29, 2011, now Pat. No. 8,365,023.

(51) Int. Cl.
*G06K 5/04* (2006.01)
(52) U.S. Cl.
USPC .......................................................... 714/700
(58) Field of Classification Search
USPC .................................... 714/700, 763, 769
See application file for complete search history.

(56) References Cited

U.S. PATENT DOCUMENTS

| 3,774,154 | A | 11/1973 | Devore et al. |
| 4,115,759 | A | 9/1978 | Besenfelder |
| 6,493,795 | B1 | 12/2002 | Arsenault et al. |
| 6,574,699 | B1 | 6/2003 | Dobbek |
| 7,240,238 | B2 | 7/2007 | Yanai et al. |
| 7,249,290 | B2 | 7/2007 | Takei et al. |
| 7,290,195 | B2 | 10/2007 | Guo et al. |
| 7,366,837 | B2 | 4/2008 | Corbett et al. |
| 7,467,335 | B2 | 12/2008 | Otto et al. |
| 7,836,250 | B2 | 11/2010 | Zohar et al. |
| 8,143,915 | B2 | 3/2012 | Hutchings |
| 2004/0153606 | A1 | 8/2004 | Schott |
| 2004/0255026 | A1 | 12/2004 | Blount et al. |
| 2006/0010358 | A1 | 1/2006 | Miller |
| 2008/0168211 | A1 | 7/2008 | Nicholson et al. |

(Continued)

FOREIGN PATENT DOCUMENTS

| CN | 101013387 A | 8/2007 |
| CN | 101131671 A | 2/2008 |
| JP | 2009199478 A | 9/2009 |

OTHER PUBLICATIONS

Guerra et al., Cost Effective Storage using Extent Based Dynamic Tiering. 9th USENIX Conference on File and Storage Technologies (FAST'11) Feb. 15-17, 2011, San Jose, CA. pp. 1-5.

(Continued)

*Primary Examiner* — James C Kerveros
(74) *Attorney, Agent, or Firm* — Griffiths & Seaton PLLC

(57) ABSTRACT

For runtime dynamic performance skew elimination in a computer environment, an exemplary computer environment is configured for calculating a rank heats by utilizing a plurality of fine-grained statistics collected at an extent granularity, including considering bandwidth (BW) and input/outputs per second (IOPS) metrics. An adaptive data placement plan is generated to relocate the data.

20 Claims, 8 Drawing Sheets

(56) References Cited

U.S. PATENT DOCUMENTS

2008/0209042 A1 8/2008 Koning et al.
2009/0019251 A1 1/2009 Helman et al.
2009/0064159 A1 3/2009 LaFrese et al.
2010/0325352 A1 12/2010 Schuette et al.
2011/0010514 A1 1/2011 Benhase et al.

OTHER PUBLICATIONS

David K. Lowenthal et al., "An Adaptive Approach to Data Placement," IEEE, 1063-7133/96, Proceedings of IPPS, 1996, pp. 349-353.

Ling-Jun Qin et al., "An Adaptive Load Balancing Algorithm in Object-Based Storage Systems," IEEE, 1-4244-0060-0/06, 2006, pp. 297-302.

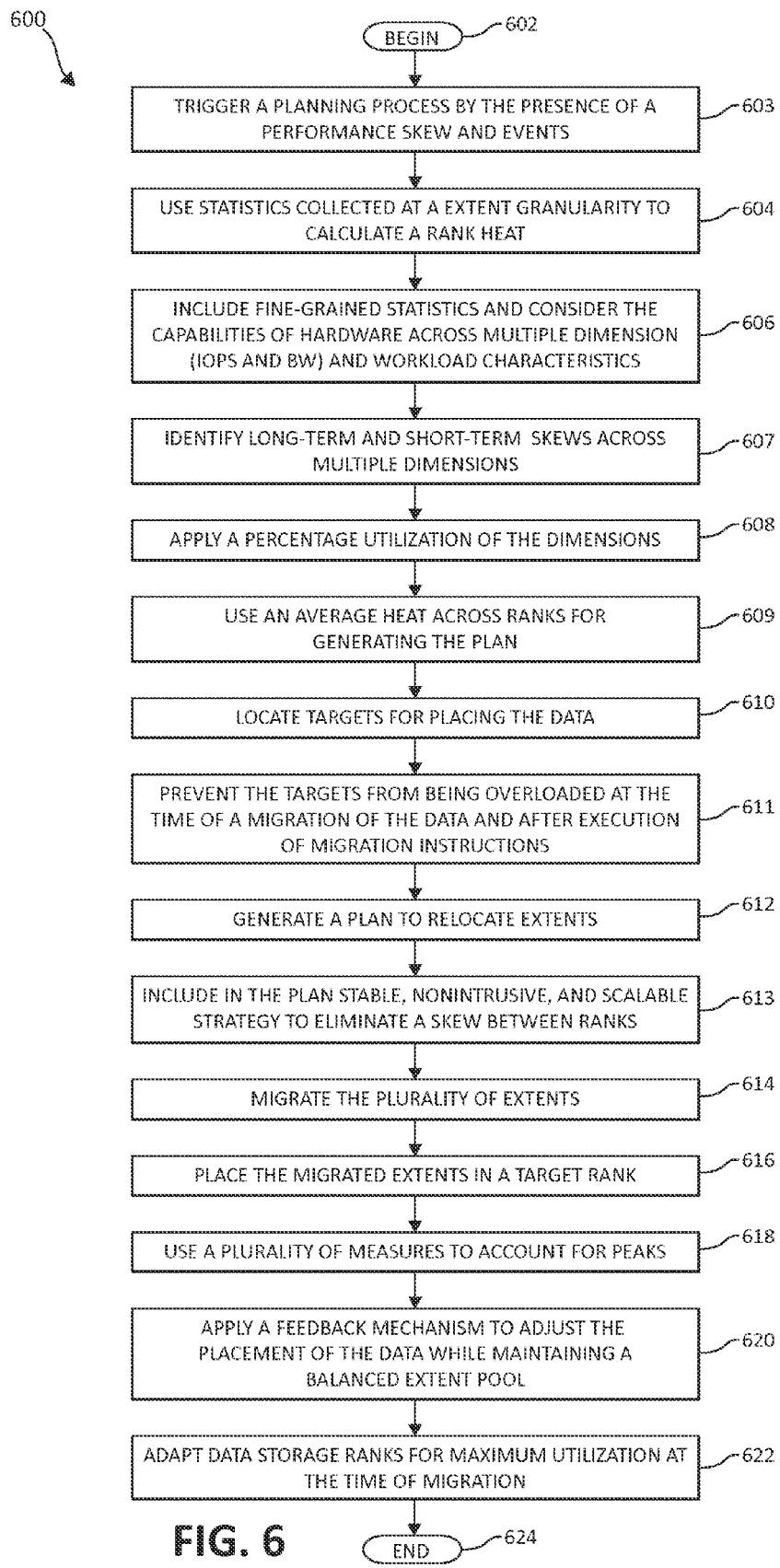

RUNTIME DYNAMIC PERFORMANCE SKEW ELIMINATION

CROSS-REFERENCE TO RELATED APPLICATIONS

This application is a Continuation of U.S. patent application Ser. No. 13/098,143, filed on Apr. 29, 2011, now U.S. Pat. No. 8,365,023.

BACKGROUND OF THE INVENTION

1. Field of the Invention

The present invention relates generally to computers, and more particularly, to runtime dynamic performance skew elimination in a computing storage environment.

2. Description of the Related Art

In today's society, computer systems are commonplace. Computer systems may be found in the workplace, at home, or at school. Computer systems may include data storage systems, or disk storage systems, to process and store data. A storage system may include one or more disk drives. The disk drives may be configured in an array, such as a Redundant Array of Independent Disks (RAID) topology, to provide data security in the event of a hardware or software failure. The data storage systems may be connected to a host, such as a mainframe computer. The disk drives in many data storage systems have commonly been known as Direct Access Storage Devices (DASD). DASD devices typically store data on a track, which is a circular path on the surface of a disk on which information is recorded and from which recorded information is read. In order to achieve higher throughput in systems where multiple concurrent IO requests are processed simultaneously, data may be distributed across multiple physical devices (such as disk drives, adapters etc.) so that requests accessing different data locations may be served simultaneously. However, over time, the workload may be such that some devices may be over-utilized while some are under-utilized. Moreover, in the data storage systems the workload of the disk storage subsystems may fluctuate over time and may develop natural skew(s). The skew may create an imbalance along both bandwidth (BW) and input/outputs (I/O) per second (IOPS) dimensions and thus fail to deliver acceptable performance.

SUMMARY OF THE DESCRIBED EMBODIMENTS

In a data processing system with a variety of storage devices, some with higher performance than others, storage systems may develop natural skews and become imbalanced along both the bandwidth and input/outputs (I/O) per second (IOPS) dimensions. The development of skews within the computing environment reduces performance and system processing.

Accordingly, and in view of the foregoing, various exemplary method, system, and computer program product embodiments for runtime dynamic performance skew elimination in a computer environment are provided. In one embodiment, the computer environment is configured for calculating a rank heats by utilizing a plurality of fine-grained statistics collected at an extent granularity, including considering bandwidth (BW) and input/outputs per second (IOPS) metrics. An adaptive data placement plan is generated to relocate the data.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 6 is a flowchart illustrating an exemplary method 600 for runtime dynamic performance skew among data storage ranks.

DETAILED DESCRIPTION OF CERTAIN EMBODIMENTS

A storage system may develop natural skews and become imbalanced along both bandwidth (BW) and input/outputs (I/O) per second (IOPS) dimensions and fail to deliver acceptable performance due to a combination of several factors. These factors may include: 1) data placement: placing "simultaneously accessed hot data" on same devices (such as ranks), 2) workload changes that make a previously optimal placement deliver sub-optimal and unacceptable performance, 3) addition/deletion/degradation of hardware and the inability of the system to adapt to configuration changes, 4) other migration activities or configuration changes such as creation/deletion/migration of volumes, and 5) migration, addition of new hardware, and degraded hardware in the system may all contribute to performance skew.

Existing approaches to address the natural skew use techniques such as striping or random placement. However, such approaches assign placement before the access pattern shows up and only reduces the probability of skew. Such an approach fails to eliminate the skew and fails to correct the skew upon the initial occurrence of the skew. Other techniques utilize a workload rebalancing approach where the workload is redirected to a redundant secondary location of the data if the primary location is overloaded. Again, such an approach fails to eliminate the skew within a storage subsystem at runtime nor addresses the problem when no secondary location is available. These approaches fail to effectively address performance degradation at the storage subsystem level, which is caused due to some ranks in the system being overloaded while some ranks are under-utilized. The main factor to such failure in addressing the problem is that these approaches do not address the issues at the fine-granularity required by the storage subsystems, or if they do, they only do so in a static manner.

In one embodiment, the mechanisms of the illustrated embodiments provide for runtime dynamic performance skew elimination by placing data adaptively among data storage ranks. An adaptive algorithm is based on workload and a configuration.

In one embodiment, the mechanisms of the illustrated embodiments utilize fine-grained statistics collected at the extent granularity to calculate rank heat(s) while taking into consideration both bandwidth and IOPS capabilities of the hardware and workload characteristics. Average rank heat across ranks (variations include using the IOPS-Latency Curve and correlation coefficients) is used, and a plan to relocate extents is generated in order to reduce long-term performance skew in the system without sudden knee-jerk reactions. The migrations are paced accordingly. A planning process is triggered both by the presence of performance skew and other events such as addition/deletion/degradation of hardware, creation/deletion/reconfiguration of volumes and other such configuration events (such as merging pools).

Figure 1:
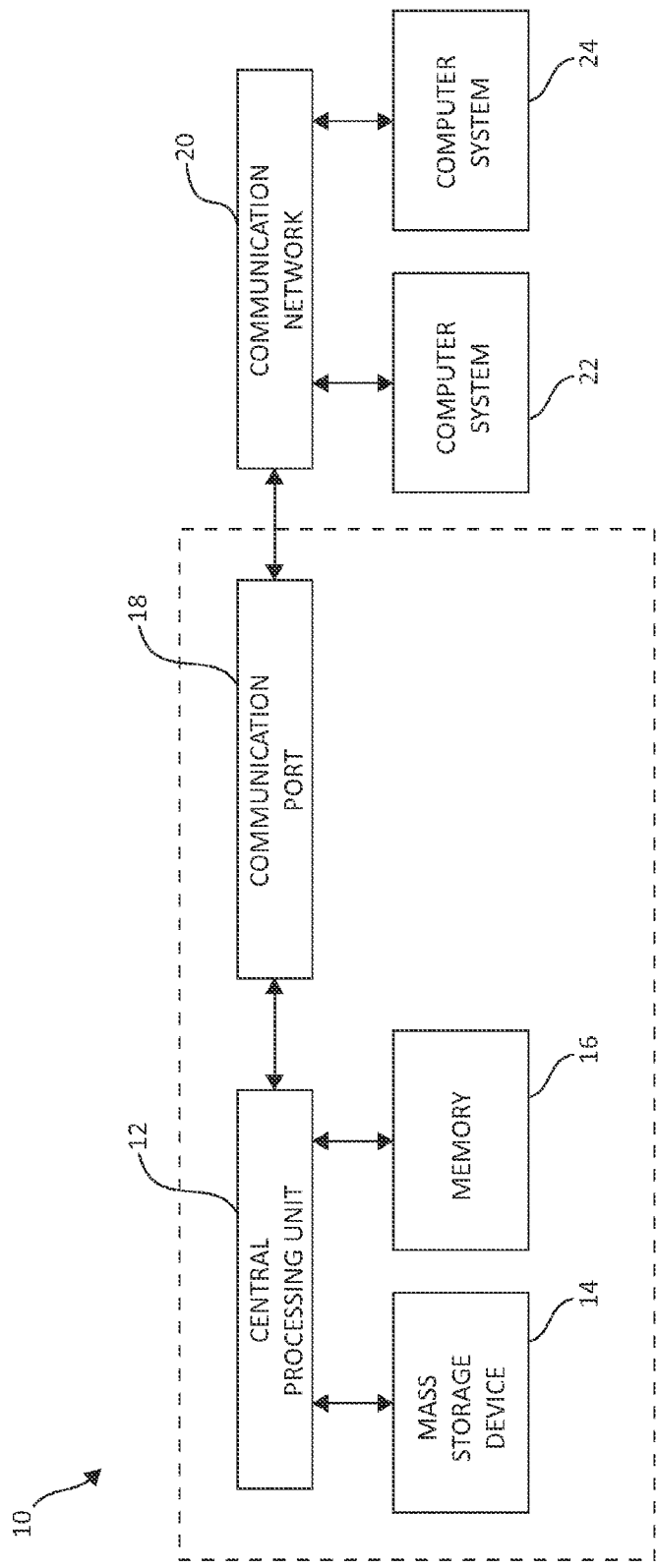
FIG. 1 illustrates a computer storage environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices can include hard disk drive (HDD) devices, solid state devices (SSD) etc, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
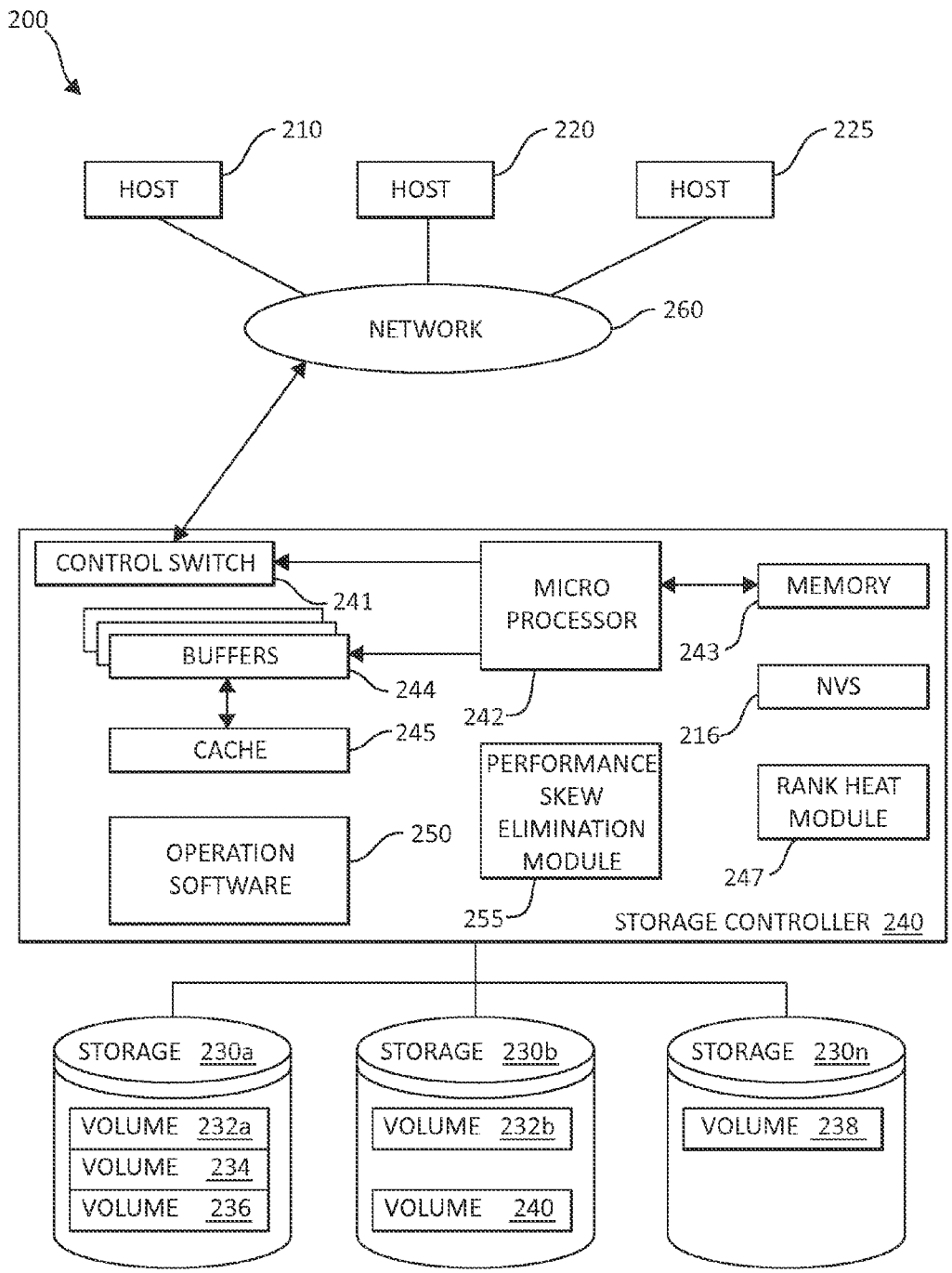
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data which the processor 242 may access for executing functions and method steps associated with managing storage 230 and executing the steps and methods of the present invention for runtime dynamic performance skew elimination in a computer storage environment. In one embodiment, system memory 243 includes, is associated, or is in communication with the operation software 250 for runtime dynamic performance skew elimination in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the CACHE 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request. In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a performance skew elimination module 255 and a rank heat module 247 to assist with runtime dynamic performance skew elimination in a computer storage environment. The performance skew elimination module 255 and rank heat module 247 may work in conjunction with each and every component of the storage controller 240, the hosts 210, 220, 225, and storage devices 230. Both the performance skew elimination module 255 and rank heat module 247 may be structurally one complete module working together and in conjunction for runtime dynamic performance skew elimination in a computer storage environment or may be individual modules. The Performance skew elimination module 255 and rank heat module 247 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, Performance skew elimination module 255, and a rank heat module 247 on which information may be set. Multiple buffers 244 may be implemented with the present invention to assist with the runtime dynamic performance skew elimination in a computer storage environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, Performance skew elimination module 255, and rank heat module 247 are in communication with each other and may be separate or one individual component(s). Also, several, if not all of the components, such as the operation software 245 may be included with the memory 243 for runtime dynamic performance skew elimination in a computer storage environment. In one embodiment, by way of example only, each of the components within the storage device may be linked together and may be in communication with each other for purposes suited to the present invention.

Figure 3:
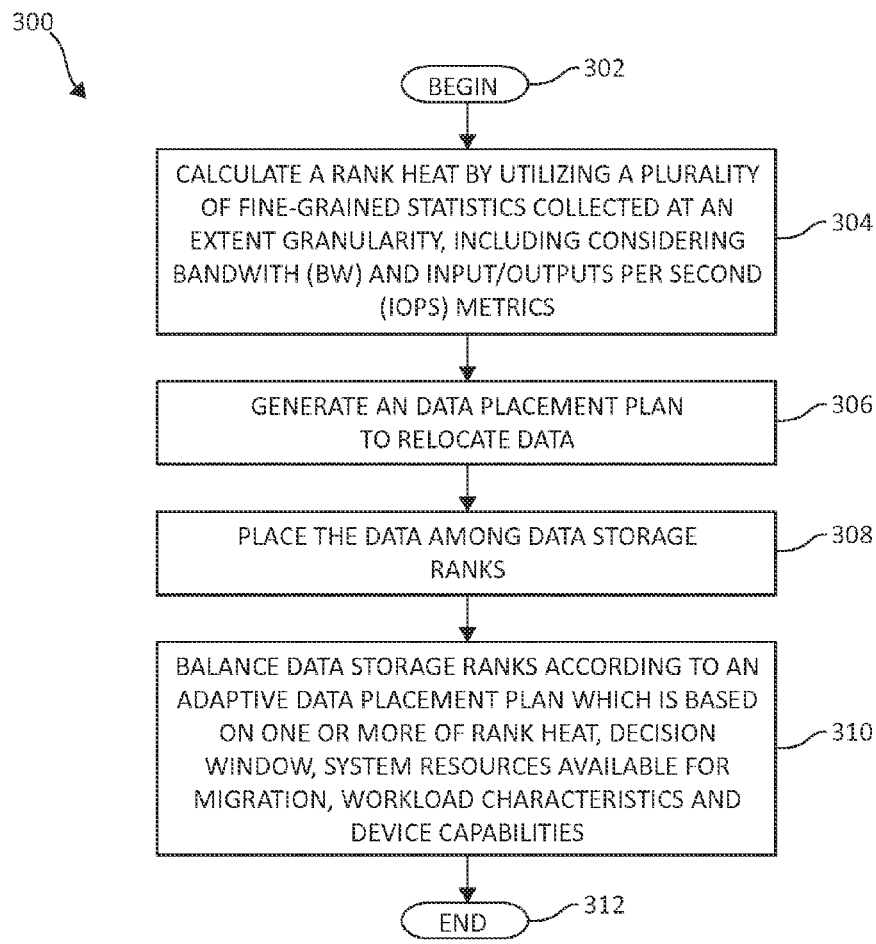
FIG. 3 is a flowchart illustrating an exemplary method 300 for runtime dynamic performance skew elimination.

FIG. 3 is a flowchart illustrating an exemplary method 300 for runtime dynamic performance skew elimination. The mechanisms of the illustrated embodiments, work to improve the overall system performance and concurrency by maintaining a balanced extent pool where workload is evenly distributed between the different ranks in the system, configuration changes being considered. Data is adaptively placed among storage ranks (devices). An adaptive data algorithm is based on workloads and system configurations. Moreover, the mechanisms of the illustrated embodiments use a rank heat that is calculated utilizing fine-grained statistics collected at the extent granularity. Using the average rank heat across the ranks, a plan is generated to relocate extents for optimum performance. An extent may be a unit of data placement. For example, in the DS8000 system, the extent may be a fixed size of 1G, which may also be the unit for data migration. The algorithm may be applied to any other unit of data placement/migration supported by the system.

The method 300 begins (step 302) by calculating one or more rank heats by utilizing a fine-grained statistics collected at an extent granularity, including considering bandwidth (BW) and input/outputs per second (IOPS) metrics (step 304). An adaptive data placement plan is generated to relocate the data (step 306). The data may be reflected as extents or data segments. The data is placed among data storage ranks (step 308). The data storage ranks are balanced according to the adaptive data placement plan (step 310). For example, the adaptive data placement plan may be based on one or more of a rebalancing algorithm (calculations), one or more rank heat(s), a decision window, and/or a threshold value for skew that may be tolerated by the system. The method 300 ends (step 312).

As mentioned, one way to reduce the workload of the disk storage subsystems is to move, place, or "migrate," heavily accessed data onto more acceptable devices when the demand arises. The adaptive data placement decision itself is complex and may take into consideration the following factors: 1) workload and variations over time including average and peak behavior, (The main issue is that locality and the relationship between data is dynamically created by workload behavior and is not known a priori, or known "prior to"), 2) device characteristics such as BW, IOPS capabilities (metrics), and 3) system configuration, such as rank assignments. The migration of data based on the adaptive data placement plan may not be an instantaneous activity and may be constrained by the available bandwidth.

The requirements for rebalancing should be scalable (i.e. resources required for rebalancing the system and eliminating the skew should be proportional to the amount of data being rebalanced), robust to short variations in the workload, dynamic, i.e. adapt to new events and changes in workload or system such as configuration changes, capable of anticipating future events such as workload and data placement changes, to allow for the fact that there may be considerable lag between analysis and execution, and generic, i.e. support a variety of device types from different vendors and also different workload behaviors (random, sequential, and/or mixed).

One of the runtime dynamic performance skew elimination objectives is for increased system performance and concurrency by maintaining balanced extent pools where the workload is evenly distributed between ranks in the system. An extent pool may be a logical construct that may be used to manage a set of extents of the same type that are associated with a given rank group. When an extent pool is defined, it may be assigned a rank group and an extent type. One or more ranks with the same extent type may be assigned to an extent pool, but a rank may be assigned to only one extent pool. There may be as many extent pools as there are ranks. There are no constraints on the number or size of ranks assigned to the extent pool. All extents of the ranks assigned to an extent pool are independently available for allocation to logical volumes that are associated with the extent pool. The mechanisms apply key components to facilitate the elimination of the skews through heat metrics calculations, a decision window, plan size estimation, and/or a runtime dynamic performance skew elimination algorithm.

A heat metric may be used to calculate rank heat(s). Rank heat is reconstructed from extent heat measurements. Extent heat measurements are collected periodically from the underlying system. The mechanisms use of extent statistics is twofold: (1) the runtime dynamic performance skew elimination uses extent heat measurements to compute rank heat and (2) the runtime dynamic performance skew elimination mechanisms uses extent heat measurements to identify hot extents in the source ranks, and in the case of a swap operation, identify and/or swap cold extents on the target rank. Rank heat may be the instantaneous rank heat based on exponential moving averages (EMA) (summary measurements) of extent heat(s) and instantaneous rank configuration (i.e. the current set of extents in the rank). In one embodiment, by way of example only, the following equations may be considered to calculate rank heat and extent heat:

$$R_h = \Sigma EMA(Hextent) \quad (1),$$

where Rh is the rank heat, EMA is the exponential moving averages, and the Hextent is the extent heat. The extent belongs to the instantaneous rank configurations (the current set of extents in the rank). The extent heat itself may be calculated as some linear combination of random and sequential IO counts such as:

$$EMA(Hextent) = EMA(RIOC) + EMA(SIOC) \quad (2),$$

Where the RIOC is the random input output count and the SIOC is the sequential input/output Count. The EMA of extent heat is maintained in order to identify hot extents within a rank. Other potential variations for calculating rank heat include using weighted metric for random and sequential access depending upon device capabilities, latency metrics, etc.

One of the goals of the runtime dynamic performance skew elimination mechanisms is to maintain the system in a balanced state for the chosen metric. This may be accomplished by using a decision window calculation. A decision window represents the frequency at which an adaptive data placement plan is generated. The length of the decision window may be chosen based on various factors including, but not limited to, the workload characteristics, the migration bandwidth available, and other applicable hardware and workload characteristics.

To illustrate the functionality of the decision window, the following description is not to be intended to apply in all situations, but to provide a working understanding for representing the frequency at which the adaptive data plan is generated and applying the various factors previously mentioned. In one embodiment, the mechanisms allow for choosing multiple decision windows, as needed, for example, the decision window may be a decision window of 6 hours. At each decision window, migration advice is generated. The advice represents the plan for migration and includes the set of extents that need to be migrated, the source ranks, and the target ranks Advice size denotes the number of such migration plans generated. For an advice size calculation, the migration advice size may be calculated using a number of factors such as number of active extents in the system, amount of migration bandwidth available, current load on the system and length of decision window.

For example, the logistical operations of the decision window may be illustrated by use of several calculations including the calculations of cost and migration advice size. These calculations are not to be intended to apply in all situations, but are illustrated for purposes of demonstrating several of the decision window calculations.

For a cost calculation:

Let Tm=Time spent on migration per decision window. (3).

The duration spent in the rebalanced state may be less than the Tm to justify resources spent on migration, for example, 4Tm. This argument implies that the decision to rebalance is based on decision window of length 4 Tm. Using the above example, assuming a decision window of 2 days, 720 minutes of migration activity may be performed per window. At the rate of 4 migrations every 5 minutes, 576 migrations may be performed per decision window. The number of ranks rebalanced per decision window may be as follows: assume 10% of the hot ranks need to be migrated in order to rebalance. (80 extents for serial attached small computer system interface (SAS)/solid-state drive (SSD) ranks and 200 extents for serial advanced technology attachment (SATA) ranks) With only "move" operations, 7.2 SAS/SSD ranks and 2.88 SATA ranks may be rebalanced. With only "swap" operations, 3.6 SAS/SSD ranks and 1.44 SATA ranks may be rebalanced per decision window.

For migration advice size:

Max Adv Size=Minimum(active extents based upper limit, bandwidth based upper limit) (4), where the Max Adv Size is the Maximum advice size, and the Minimum is the active extents based upper limit and the bandwidth based upper limit.

$$\text{Act extent}_{up} = \#\text{extents}_{tier}/2 \quad (5),$$

where Act extent$_{up}$ is the active extents based upper limit and the #extents$_{tier}$ is the number of extents in the tier.

$$BW_{up} = (\#ranks_{tier} * rankBW_{threshold} * (\% BW_{mig}/100.0) * DW_D)/(\text{extent}_{MB}) \quad (6),$$

where BW$_{up}$ is the bandwidth based upper limit, the #ranks$_{tier}$ is the number of ranks in tier, the rankBW$_{threshold}$ is the rank bandwidth threshold, the % BW$_{mig}$ is the percentage of bandwidth available for migration, the DW$_D$ is the duration of decision window, and the extent$_{MB}$ is the extent size in Mega-Bytes (MB).

Thus, these calculations may be utilized within the decision window to accomplish on of the goals of the runtime dynamic performance skew elimination by maintaining the system in a balanced state for the chosen metric.

As previously mentioned, the mechanisms may apply a probabilistic algorithm to identify the potential targets for data placement activity while ensuring that the targets are not overloaded at the time of migration. Simultaneously, the adaptive data algorithm ensures that devices (ranks) are not under-utilized. In one embodiment, for each tier in the current extent pool, the calculations and the adaptive data algorithm flow may be described as follows. First, the mechanisms may calculate a rank heat for each rank, where the projected rank heat (PRH) may be equal to the actual rank heat (ARH). Second, the rank heat(s) are sorted in decreasing order of rank heat. It should be noted that rank heat may be one singular rank heat or may include multiple rank heats according to the needs of the computing system or desired preferences. Moreover, depending upon the system, the rank heat(s) may also be sorted in increasing order. Third, calculate the average (AVE) and standard deviation (STDEV) of rank heat amongst the set of ranks being rebalanced. Fourth, the mechanism may identify set(s) of hot ranks H where PRH is greater than the AVE. Fifth, while hot ranks exist and target ranks exist, the mechanisms may designate a hot rank as a source rank and one of its extents as a source extent from the source rank. Sixth, the mechanisms may identify multiple target ranks (cold ranks or just "C") where PRH is less than AVE and the PRH is less than the input/output (I/O) threshold of rank. The threshold for a rank may be determined statically based on device calibration to see what the maximum acceptable load on a rank is before the latency exceeds acceptable performance. If the heat (source extent) plus the PRH (target rank) is less than AVE then determine if spare capacity exists in target rank and move source extent to target rank. Otherwise, identify the target extent as equal to the coldest extent in target rank and then swap the target extent with source extent, followed by updating the PRH of source and target ranks The mechanisms may repeat the sorting of the rank heat in decreasing/increasing order of rank heat(s). Moreover, the may employ the adaptive algorithm aimed at minimizing the skew in the system by trying to achieve smaller standard deviations between rank heat(s). Other variations of the algorithm function to reduce the skew, as will be described below.

Figure 4:
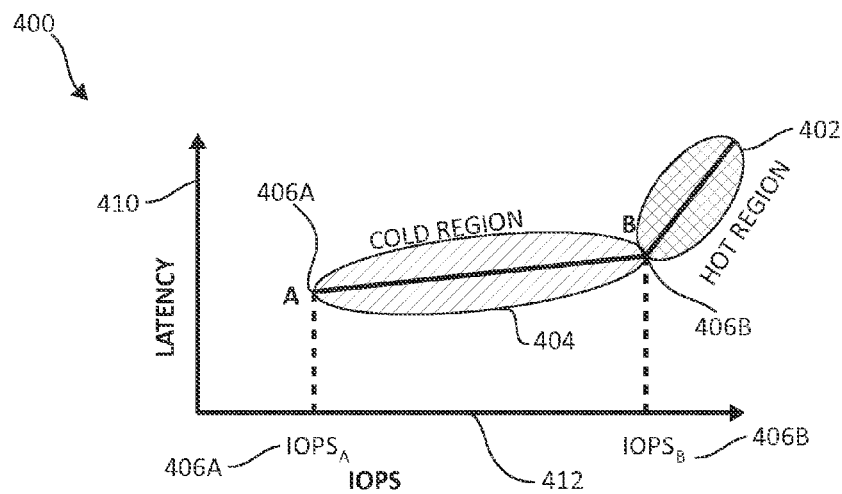
FIG. 4 is an exemplary diagram illustrating a latency-curve in which aspects of the present invention may be realized.

FIG. 4 is an exemplary diagram illustrating a latency-curve 400 in which the present invention may be realized. In devices within the data storage system, for example, FIG. 1 and FIG. 2, a latency-IOPS curve may be known a priori, resembling the latency-curve (curve) 400 in FIG. 4. The vertical axis 410 of the latency-curve 400 illustrates the latency of the system the horizontal axis 412 illustrates the IOPS 406 (shown in FIG. 4 as 406A-406B). The curve shows the hot region 402 (illustrated with a grid like pattern) and the cold region 404 (illustrated with diagonal lines) along with the IPOSA 406A marked with an "A" and the IOPSB 406B marked with a "B." Once the IOPSB is known, a rank threshold may be calculated.

In one embodiment, a possible variation of the algorithm for runtime dynamic performance skew elimination uses the IOPS latency curve 400 and is similar to the original algorithm described previously, except that a rank is classified as "hot" i.e. a source rank if the projected rank heat (PRH) is more than the IOPSB threshold of the rank. In one embodiment, a rank may be classified as "cold," i.e. target rank, if the PRH is less than IOPSB. The IOPSB may be computed based on IOPSB point of device type, the number of drives in the rank, and a RAID scheme.

In one embodiment, a third variation of the adaptive data algorithm uses correlation coefficients to identify tightly correlated hot extents and redistributes the extents so as to reduce the workload spikes that cause ranks to become overloaded. In one embodiment, the mechanisms identify the top-N % of hottest extents in the extent pools being considered for skew elimination. Since the total number of extents in a pool may be large, for the sake of efficiency, the mechanisms may limit the rebalancing operation to the top-N % of hottest extents, which is determined based on EMA (extent-heat). A mutual correlation co-efficient is calculated between these extents. Using a simple correlation clustering mechanism, the mechanisms will divide the extents into clusters of positively correlated extents. For each cluster, the extents may be sorted according to extent heat. The extents are redistributed using striping across ranks available in the tier.

Figure 5A:
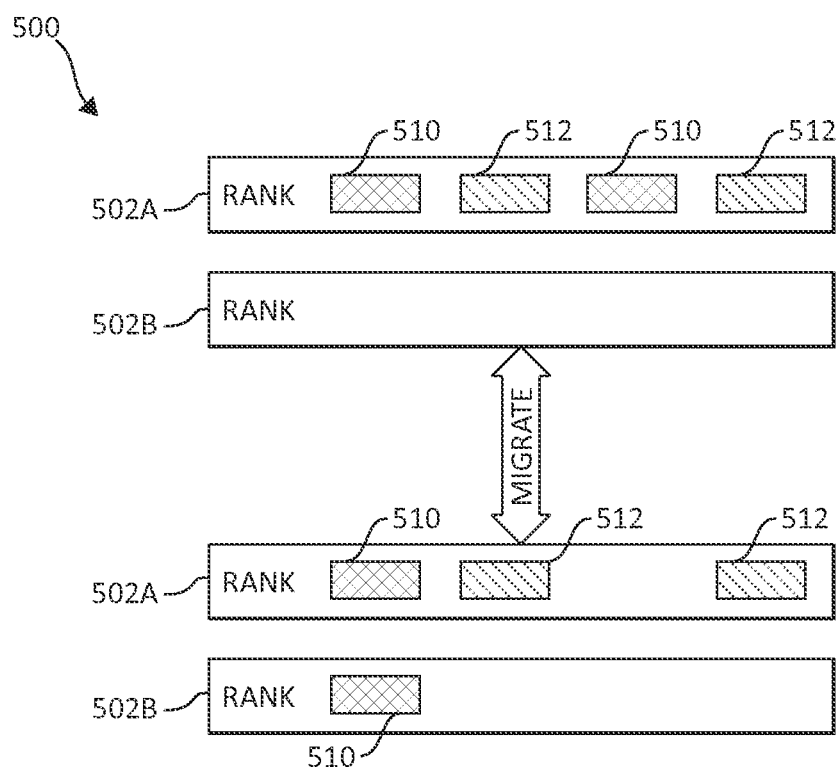
FIG. 5A is an exemplary diagram illustrating an add rank use-case in which aspects of the present invention may be realized.

FIG. 5A-D are exemplary diagrams illustrating the various processes and mechanisms for performance skew elimination. FIG. 5A is an exemplary diagram 500 illustrating an add rank use-case in which aspects of the present invention may be realized. FIG. 5A-5d each illustrates several ranks 502. Within each of the ranks 502A are several extents; either a hot extent 510 or a cold extent 512. The ranks 502 are divided into a hot rank 502A and a target rank 502B for purposes of illustrating the migration of the hot extent 510 and/or the cold extents 512. In FIG. 5A, a pre-condition may be recognized with the existence of multiple ranks in the same tier. Several additional preconditions may include: 1) the availability of rank statistics and ability to sort the ranks, and 2) the availability of rank configuration, such as rank mapping.

In one embodiment, the mechanisms are triggered by the addition of a new rank in a tier with a pre-existing rank. Upon being triggered, the mechanisms may compute heat for all ranks in the tier. While the performance skew exceeds threshold, which can be defined as the acceptable amount of skew in the system, the mechanisms may identify hot ranks (where heat exceeds threshold). The Target rank 502B may equal the newly added ranks. If hot ranks 502A exist then the mechanisms may migrate the hot extent (510) from hot rank 502A to target rank 502B. For example, the hot extent 510 in the hot rank 502A is migrated to the target rank 502B. The subsequent migration shows the new hot rank 502A without the migrated hot extent 510. The migrated hot extent 510 now appears in the target rank 502B. FIG. 5A illustrates the target rank 502B to be empty, and after the hot extent 510 is migrated, the target rank now contains one hot extent 510.

Figure 5B:
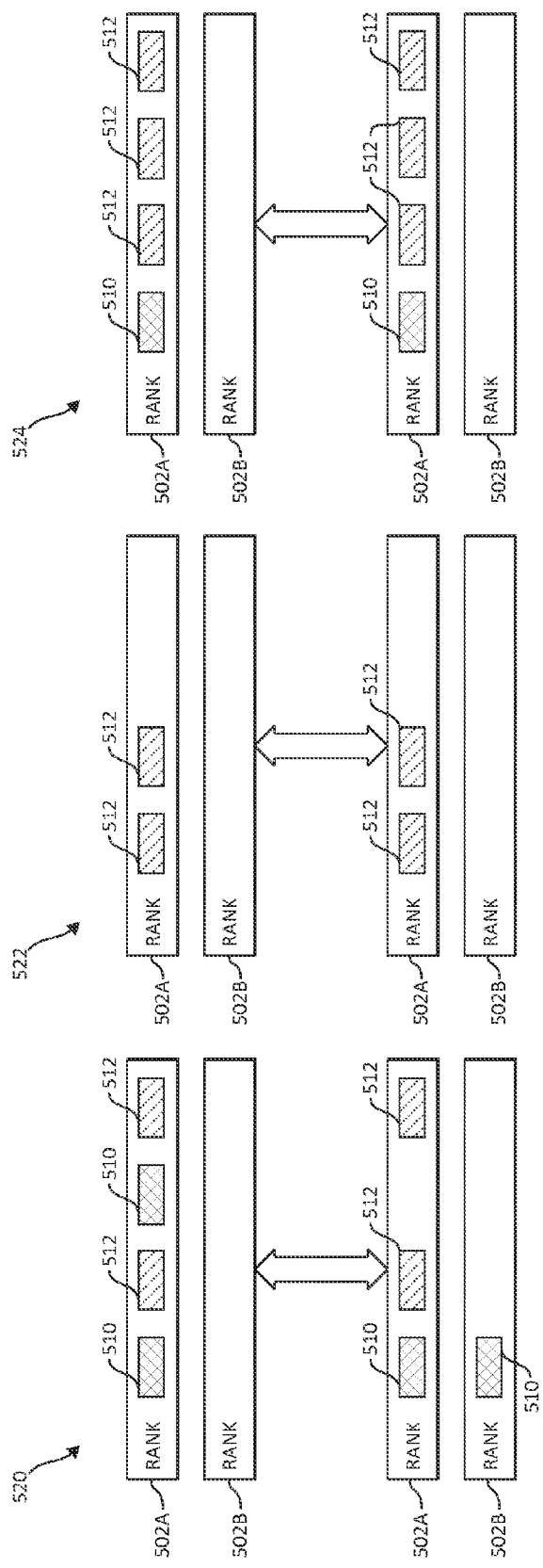
FIG. 5B is an exemplary diagram illustrating an add rank alternative flow in which aspects of the present may be realized.

FIG. 5B is an exemplary diagram illustrating an add rank alternative flow in which the present invention may be realized. Within FIG. 5B, three scenarios 520, 522, and 524 illustrate the add rank with alternative flows. In the first scenario 520, one of the hot extents 510 is migrated from hot rank 502A to target rank 502B. The migration occurs to a newly added rank. In the second scenario 522, no hot extent (510) are present in the hot rank 502A, and only cold extents 512 are found in the hot rank 502A. No migration from the hot ranks 502A to target rank 502B occurs because the performance skew fails to exceed the threshold. In the third scenario 524, despite the presence of hot extents (510) in the hot rank 502A, migration from the hot rank 502A to target rank 502B does not occur since the source rank is not sufficiently hot.

Figure 5C:
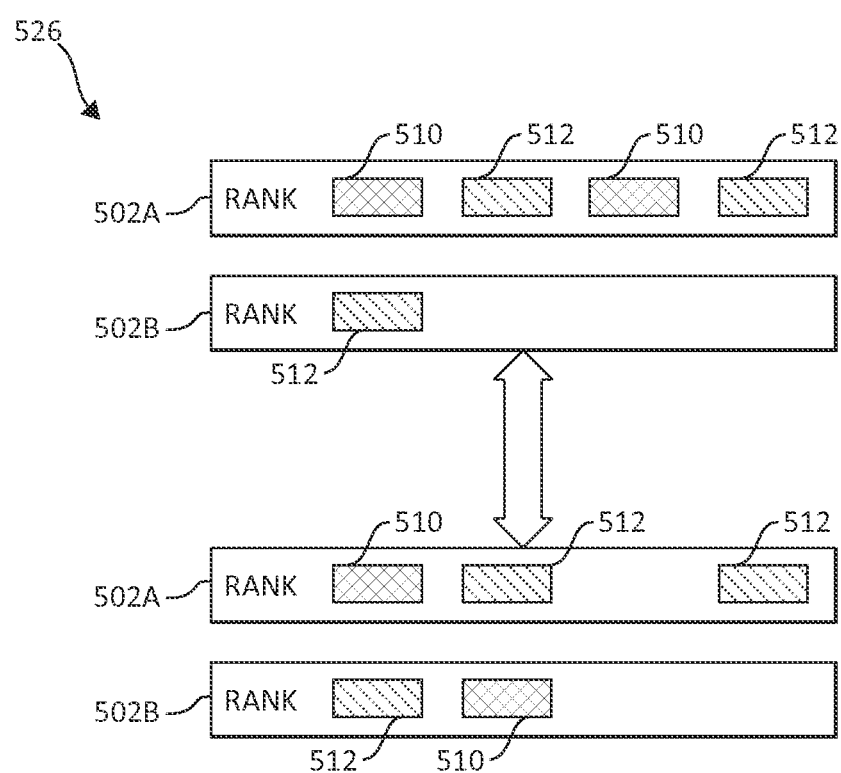
FIG. 5C is an exemplary diagram illustrating a performance skew use-case in which aspects of the present invention may be realized.

FIG. 5C is an exemplary diagram illustrating a performance skew use-case in which the present invention may be realized. In one embodiment, a pre-condition may be recognized with the existence of multiple ranks in the same tier. Several additional preconditions may include: 1) the availability of rank statistics and ability to sort the ranks, and 2) the availability of rank configuration such as rank mapping.

In one embodiment, the mechanisms are triggered by the current time cycle being at the decision window. Upon being triggered, the mechanisms may compute a rank heat for all ranks in the tier. While the rank performance skew exceeds threshold, which can be defined as the acceptable amount of skew in the system, the mechanisms of the illustrated embodiments may identify hot ranks (where heat exceeds threshold). If hot ranks 502A exist, than the mechanisms of the illustrated embodiments may target ranks 502B (where skew between source and target is maximum). If there is spare capacity in the target ranks 502B, the mechanisms may move a hot extent 510 from the hot rank 502A to a target rank 502B. Otherwise, the mechanisms may swap hot extent 510 from hot rank 502A with cold extent 512 from the target rank 502B. For example, the migrated hot extent 510 from hot rank 502A now appears in the target rank 502B. FIG. 5C illustrates the target rank 502B to only contain a cold extent 512 before the migration, and after the migration, the hot extent 510 is placed in target rank 502B, which now contains one hot extent 510 and one cold extent 512.

Figure 5D:
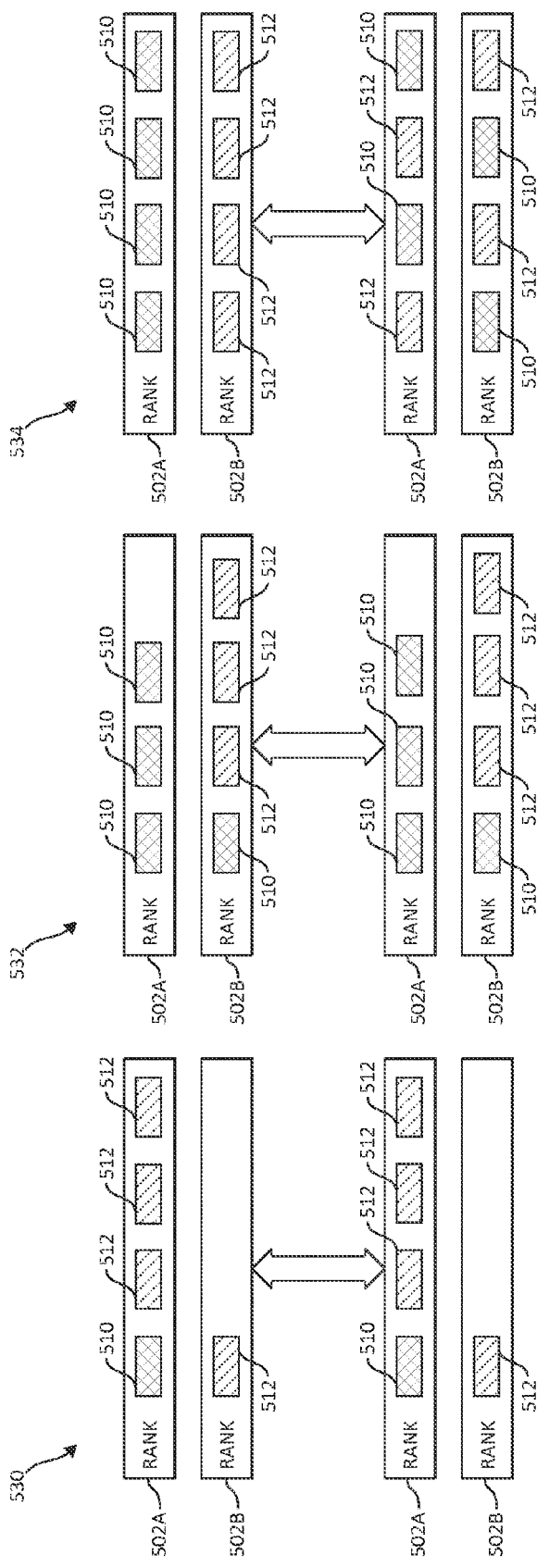
FIG. 5D is an exemplary diagram illustrating a performance skew elimination mechanisms with alternative flows in which aspects of the present invention may be realized.

FIG. 5D is an exemplary diagram illustrating performance skew elimination mechanisms with alternative flows in which the present invention may be realized. Within FIG. 5D, three scenarios 530, 532, and 524 illustrate the performance skew use-case with alternative flows. In the first scenario 530, only one hot extent 510 exists in the hot rank 502A with the presence of several cold extents 512. No migration from hot rank 502A to target rank 502B occurs because the source rank is not sufficiently hot. It should be noted that another condition for not migrating extents from the hot rank to the cold rank is if the migration will cause the cold rank to exceed the AVE heat amongst the ranks being rebalanced or if the migration will cause the cold rank load to exceed the device threshold. In the second scenario 532, both hot extents 510 and cold extents 512 are present in the target rank 502B and only hot extents 510 are present in the hot rank 502A. No migration occurs since the performance skew does not exceed a threshold. In the third scenario 534, the hot rank 502A is completely full of hot extents (510) and the target rank 502B is completely full of cold extends 512. Migration from the hot rank 502A to target rank 502B takes place or "swaps" some of the hot extents 510 with some of the cold extents 512 since there is no spare capacity, either in the hot rank 502A or cold rank 502B.

FIG. 6 is a flowchart illustrating an exemplary method 600 for runtime dynamic performance skew among data storage ranks. In one embodiment, the mechanisms of the illustrated embodiments identifies long term skew(s) across multiple dimensions/metrics (BW and IOPS) and provides a stable, unintrusive and scalable strategy to eliminate skew between ranks within a single tier of a multi-tier system. By using a percentage utilization factor of the IOPS and BW resources, an algorithm may be generated and may automatically apply to multiple vendor devices. Furthermore, by using summary measures such as exponential moving averages (EMAs), an algorithm may account for sharp peaks without knee-jerk reactions. A probabilistic algorithm may be used and employed to identify the potential targets for data placement activity while ensuring that the targets are not already overloaded at the time of migration or after execution of the migration plan, while simultaneously the algorithm ensures that devices (ranks) are not under-utilized. In one embodiment, several feedback mechanisms are used to adjust amount of placement advice generated depending upon system activity so as to identify toggling between "hot" and "cold" in the system, and automatically stop advice generation when situations that may not be remedied are identified.

The method begins (step 602) with triggering a planning process by the presence of a performance skew and events (step 603). The method 600 will use statistics collected at an extent granularity to calculate a rank heat (step 604). Fine-grained statistics are included in the statistics and the method 600 will consider the capabilities of various hardware devices along multiple dimensions (such as bandwidth and input/output operations per second) and workload characteristics (step 606). Long-term and short-term skews across multiple dimensions are identified (step 607). The method 600 will apply a percentage utilization of the dimensions (step 608). An average heat across ranks is used for generating a plan (step 609). Targets are located for adaptively placing the data (step 610). The targets (target devices) are prevented from being overloaded at the time of a migration of the data and after execution of migration instructions (step 611). A plan to relocate, migrate, and place extents is generated (step 612). The method will include in the plan stable, nonintrusive, and scalable strategy to eliminate a skew between ranks, for example, within a single tier of a multitier system (step 613). One or more extents are migrated (step 614). The method 600 will place the migrated extents in a target rank (step 616). Several measures are used and employed to account for sharp peaks (step 618). The method will apply a feedback mechanism to adjust the placement of the data while maintaining a balanced extent pool (step 620). The method 600 will adapt data storage ranks for maximum utilization at the time of migration (step 622). The method 600 end (step 624).

As previously described, the mechanisms utilizes fine-grained statistics collected at the extent granularity to calculate rank heat while taking into consideration both bandwidth and IOPS capabilities of the hardware and workload characteristics. Using the average heat rank across ranks (variations include using the IOPS-Latency Curve and Correlation Coefficients), the mechanisms may generate a plan to relocate extents in order to reduce long-term performance skew(s) in the system without sudden knee-jerk reactions. The migrations of the data (extents) are paced out and a planning process for an adaptive data plan is triggered both by the presence of performance skew and other events such as addition/deletion/degradation of hardware, creation/deletion/reconfiguration of volumes and other such configuration events (such as merging pools).

It is appreciated that terminology such as "mandatory", "required", "need" and "must" refer to implementation choices made within the context of a particular implementation or application described here within for clarity and are not intended to be limiting since in an alternative implantation, operation, construction, or implementation, the same elements might be defined as not mandatory and not required or might even be eliminated altogether. In addition, a component or structure mentioned or described herein in the singular context may only be described in a particular implementation or application for clarity and by way of example and is not intended to be limiting because multiple components or structures may be utilized in an alternative implantation, operation, construction, and/or implementation of the methods and systems described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for runtime dynamic performance skew elimination in a computing storage environment, comprising:
    at least one processor device operable in the computing storage environment, wherein the at least one processor device:
        calculates a plurality of rank heats by utilizing a plurality of fine-grained statistics collected at an extent granularity, including considering bandwidth (BW) and input/outputs per second (IOPS) metrics.

2. The system of claim 1, wherein the processor device performs each of:
    generating an adaptive data placement plan to relocate data,
    placing the data among a plurality of data storage ranks, and
    balancing the plurality of data storage ranks according to the adaptive data placement plan.

3. The system of claim 2, wherein the processor device uses one of an average heat rank across the plurality of data storage ranks, a IOPS latency curve, and the plurality of correlation coefficients for generating the adaptive data placement plan.

4. The system of claim 2, wherein the processor device performs at least one of:
    placing the data in one of a plurality of targets in the plurality of data storage ranks, and
    triggering a planning process for the adaptive data plan by the presence of a performance skew and a plurality of events.

5. The system of claim 2, wherein the processor device performs at least one of:
    identifying a plurality of skews across a plurality of dimensions of at least one of the bandwidth (BW) and the IOPS metrics, applying a percentage utilization of the plurality of dimensions, locating a plurality of targets for placing of the data, using a plurality of summary measures to account for a plurality of peaks, and applying a feedback mechanism to adjust the placement of the data.

6. The system of claim 2, wherein the processor device performs at least one of:

preventing a plurality of targets from being overloaded at the time of placing the data among the plurality of data storage ranks, and adapting the plurality of data storage ranks for maximum utilization at the time of migration.

7. The system of claim 1, wherein the processor device performs at least one of:

sorting the plurality of rank heats according to one of an increasing and decreasing order, calculating one of an average and standard deviation rank heats from the plurality of rank heats, identifying a plurality of hot ranks (H) having a projected rank heat (PRH) is greater than an actual rank heat (ARH), while the plurality of hot ranks and a plurality of target ranks exists, designating a source rank as a hottest rank and a source extent as one of a hottest extent from the source rank, and identifying those of the plurality of target ranks as cold ranks (C) where the PRH is less than the AVE and the PRH is less than an input/output (I/O) threshold of the plurality of data storage ranks.

8. The system of claim 7, wherein the processor device, for the identifying those of the plurality of target ranks as cold ranks includes, if the source extent and the PRH is less than the AVE:

if a spare capacity exists on the plurality of target ranks, moves the source extent to one of the plurality of target ranks, otherwise:

identifies a target extent as equal to a coldest extent in one of the plurality of target ranks, and swaps the target extent with the source extent, wherein the PRH of the source rank and the target rank are updated.

9. The system of claim 2, wherein the processor device includes in the adaptive data placement plan a stable, nonintrusive, and scalable strategy to eliminate skew between the plurality of data storage ranks.

10. The system of claim 2, wherein the processor device migrates a plurality of extents.

11. A system for runtime dynamic performance skew elimination in a computing storage environment, comprising:

at least one processor device operable in the computing storage environment, wherein the at least one processor device:

calculates a plurality of rank heats by utilizing a plurality of fine-grained statistics collected at an extent granularity, including considering bandwidth (BW) and input/outputs per second (IOPS) metrics; and generates an adaptive data placement plan to relocate data.

12. The system of claim 11, wherein the processor device performs each of:

placing the data among a plurality of data storage ranks, and balancing the plurality of data storage ranks according to the adaptive data placement plan.

13. The system of claim 11, wherein the processor device uses one of an average heat rank across the plurality of data storage ranks, a IOPS latency curve, and the plurality of correlation coefficients for generating the adaptive data placement plan.

14. The system of claim 11, wherein the processor device performs at least one of:

placing the data in one of a plurality of targets in the plurality of data storage ranks, and triggering a planning process for the adaptive data plan by the presence of a performance skew and a plurality of events.

15. The system of claim 11, wherein the processor device performs at least one of:

identifying a plurality of skews across a plurality of dimensions of at least one of the bandwidth (BW) and the IOPS metrics, applying a percentage utilization of the plurality of dimensions, locating a plurality of targets for placing of the data, using a plurality of summary measures to account for a plurality of peaks, and applying a feedback mechanism to adjust the placement of the data.

16. The system of claim 11, wherein the processor device performs at least one of:

preventing a plurality of targets from being overloaded at the time of placing the data among the plurality of data storage ranks, and adapting the plurality of data storage ranks for maximum utilization at the time of migration.

17. The system of claim 11, wherein the processor device performs at least one of:

sorting the plurality of rank heats according to one of an increasing and decreasing order, calculating one of an average and standard deviation rank heats from the plurality of rank heats, identifying a plurality of hot ranks (H) having a projected rank heat (PRH) is greater than an actual rank heat (ARH), while the plurality of hot ranks and a plurality of target ranks exists, designating a source rank as a hottest rank and a source extent as one of a hottest extent from the source rank, and identifying those of the plurality of target ranks as cold ranks (C) where the PRH is less than the AVE and the PRH is less than an input/output (I/O) threshold of the plurality of data storage ranks.

18. The system of claim 17, wherein the processor device, for the identifying those of the plurality of target ranks as cold ranks includes, if the source extent and the PRH is less than the AVE:

if a spare capacity exists on the plurality of target ranks, moves the source extent to one of the plurality of target ranks, otherwise:

identifies a target extent as equal to a coldest extent in one of the plurality of target ranks, and swaps the target extent with the source extent, wherein the PRH of the source rank and the target rank are updated.

19. The system of claim 11, wherein the processor device includes in the adaptive data placement plan a stable, nonintrusive, and scalable strategy to eliminate skew between the plurality of data storage ranks.

20. The system of claim 11, wherein the processor device migrates a plurality of extents.

* * * * *